Oct. 10, 1944.  R. H. KIENLE ET AL  2,359,736
DEVICE FOR MEASUREMENT OF COLOR CHANGES AND REACTIONS
Filed Aug. 29, 1940  3 Sheets-Sheet 1

INVENTORS
ROY H. KIENLE,
ROBERT H. PARK,
BY CHARLES H. BENBROOK,
EVERETT F. GRIEB,
Robert Linen Morton ATTORNEY.

Oct. 10, 1944.　　　R. H. KIENLE ET AL　　　2,359,736
DEVICE FOR MEASUREMENT OF COLOR CHANGES AND REACTIONS
Filed Aug. 29, 1940　　　3 Sheets-Sheet 2

INVENTORS
ROY H. KIENLE,
ROBERT H. PARK
BY　CHARLES H. BENBROOK,
EVERETT F. GRIEB,
ATTORNEY.

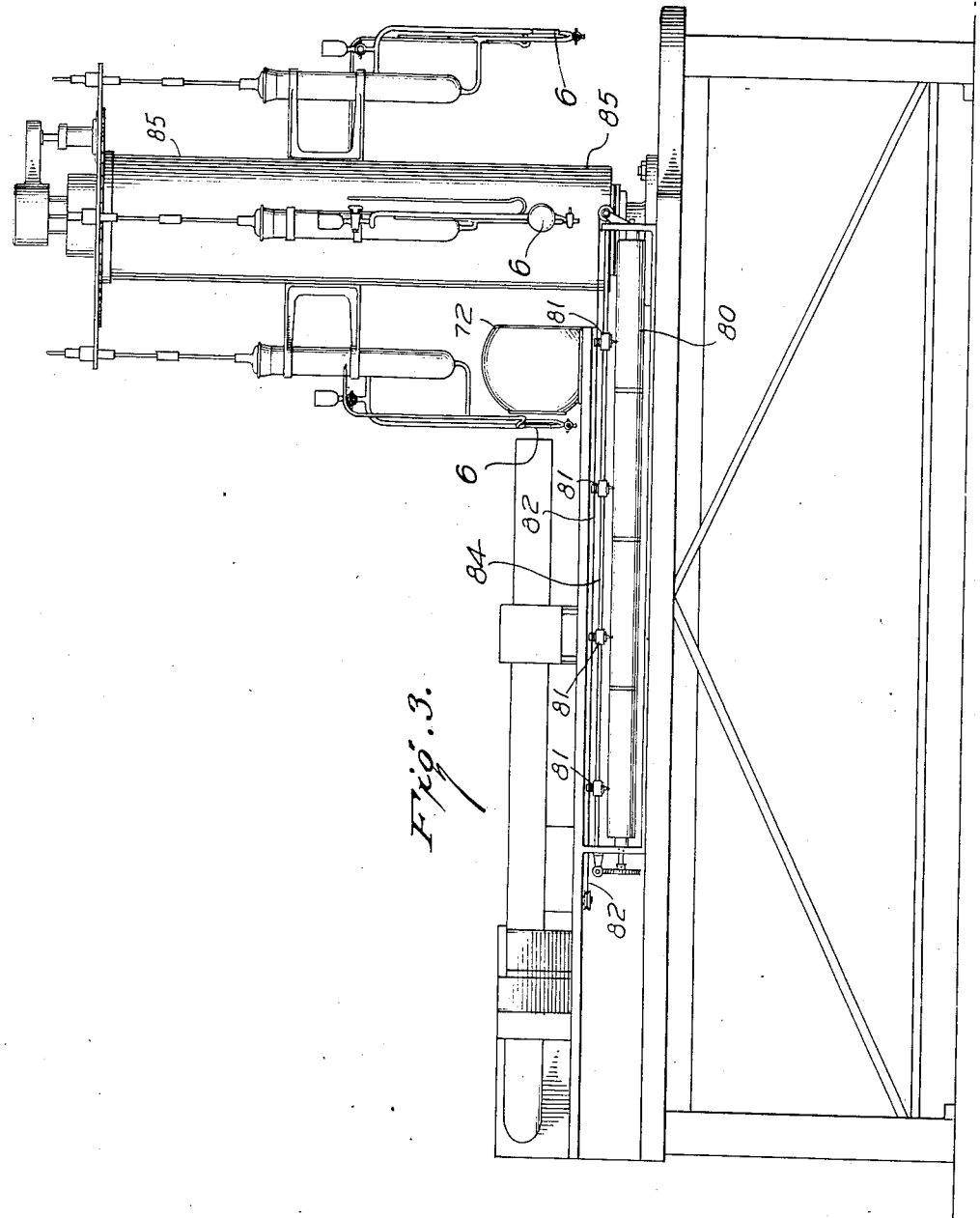

# UNITED STATES PATENT OFFICE 2,359,736

DEVICE FOR MEASUREMENT OF COLOR CHANGES AND REACTIONS

Roy Herman Kienle, Bound Brook, Robert H. Park, Bridgewater Township, Somerset County, Charles H. Benbrook, North Plainfield, and Everett F. Grieb, Bound Brook, N. J., assignors to American Cyanamid Company, New York, N. Y., a corporation of Maine Application August 29, 1940, Serial No. 354,702

1 Claim. (Cl. 88—14)

This invention relates to devices for measuring changes in color in a reaction and more particularly to devices for measuring dyeing processes.

Many reactions are accompanied by a change in color among which dyeing procedures are perhaps the most common. It is important to determine how far a reaction has gone and in case of investigations on new or modified reactions, it is also important to follow the course of the reaction. Attempts to do this visually are not in the main satisfactory because no quantitative results are obtained due to the lack of analytical power of the eye. In the past, therefore, it has become increasingly the practice to examine samples of reaction mixtures in which a color change is taking place by putting the sample in a spectrophotometer, colorimeter, or other device capable of giving a measurement of color intensity either throughout the spectrum or at a given wave length. Such procedures, however, require the taking of a sample, putting the sample in the spectrophotometer or colorimeter, obtaining a reading and then taking another sample. The labor is very great if a large number of samples have to be taken and where changes are rapid as they are in some points in the reaction, the readings may occur at too long intervals to give a useful indication of color change. Many reactions also suffer from exposure to air which almost invariably occurs in sampling, viz., the leuco of a vat dye.

The present invention is directed to a device for continuous measurement of color changes in any system where a colored component is available in fluid form. Essentially the present invention includes the combination with the reaction chamber of a device for continuously circulating a small but representative portion of a colored liquid component through a suitable cell where the transmission either at a fixed color or throughout the spectrum is continuously measured. The measurement may be, for example, by a spectrophotometer which may for part or all of the time be set at a fixed wave length. In every case, however, the rate of response of the specific portion of the system must be sufficiently rapid to assure readings which will give a correct picture of change of color with time.

For research purposes or in cases where the operations take place with various colors, a spectrophotometer is used which can be rapidly adjusted from one wave length to another or which, in the case of sufficiently slow changes of color with time, records series of spectral curves. It is undesirable to tie up a large instrument such as a spectrophotometer permanently with any particular reaction vessel, therefore, there is included a device in which cells from one or a series of reaction vessels can be moved into operative alignment with a single spectrophotometer so that the spectrophotometer can be used in rapid succession for recording a number of reactions either successively or intermittently without interrupting the continuous flow through the cell.

Throughout the present specification the term "reaction" or "reaction mixture" is used somewhat loosely. In some dyeing procedures there is an actual reaction of the dye with the material being dyed. In other cases the association may be physical. The result, however, is a change in total chemical composition of the bath so that there is a continuous chemical change which is manifested by changes in color, precisely as is the case in a reaction where there is an actual chemical change taking place by reacting one component with another. The optical measurement is of course not concerned with the past history of the color change and the utility of the present invention is likewise not concerned with the underlying chemistry which produces the change in color. For this reason the terms "reaction" and "reaction mixture" in the specification and claim are used in a somewhat loose form to indicate a change in total chemical composition whether this results from a true chemical reaction or from a physical removal or addition of certain colored constituents.

While the optical instruments or rather the general type or principles of operation of the instruments form an integral part of the invention since they determine the nature of the measurement, the present invention is not concerned with details of construction of the optical instruments except insofar as these constructional details adapt them for measurement of the circulating liquids which are a feature of the present invention. In other words, the present invention is concerned with a combination of certain types of optical instruments operating on certain principles with other elements of the finished device and is not concerned with improvements in structural details such as prisms, mirrors, lenses, light sources, and the like. It is an advantage of the present invention that standard parts may to a large extent be used in the optical portion of the apparatus so that it is not necessary to obtain special optics with correspondingly increased price. It is also possible to take standard optical instruments and with only minor structural changes incorporate them in the present invention which permits the utilization of suitable spectrophotometers which are already owned, or permits obtaining the optical parts of the apparatus in standard form. This is an important advantage as there are few concerns equipped to design and build complicated optical apparatus and the possibility of utilizing other types of equipment makes the present invention more generally available.

The present invention is useful not only in the visible portion of the spectrum but throughout the whole zone of optical radiation, that is to say, radiations that are capable of being concentrated by optical means and hence includes infrared and ultraviolet. The internal constructions of a spectrophotometer for ultraviolet or infrared frequently have to be modified because of the nature of the radiation. However, the principles of the present invention apply in the same way, the only changes being in the spectrophotometer portion of the device and the cell. As the present invention has a particular use with measurements made in the visible spectrum, the specific description which follows will in the main be directed to this modification.

The invention will be described in greater detail in conjunction with the drawings in which:

Fig. 3 is an elevation of the device shown in Fig. 2.

In the figures the same reference numerals will be used to designate the same functional parts.

Figure 1:
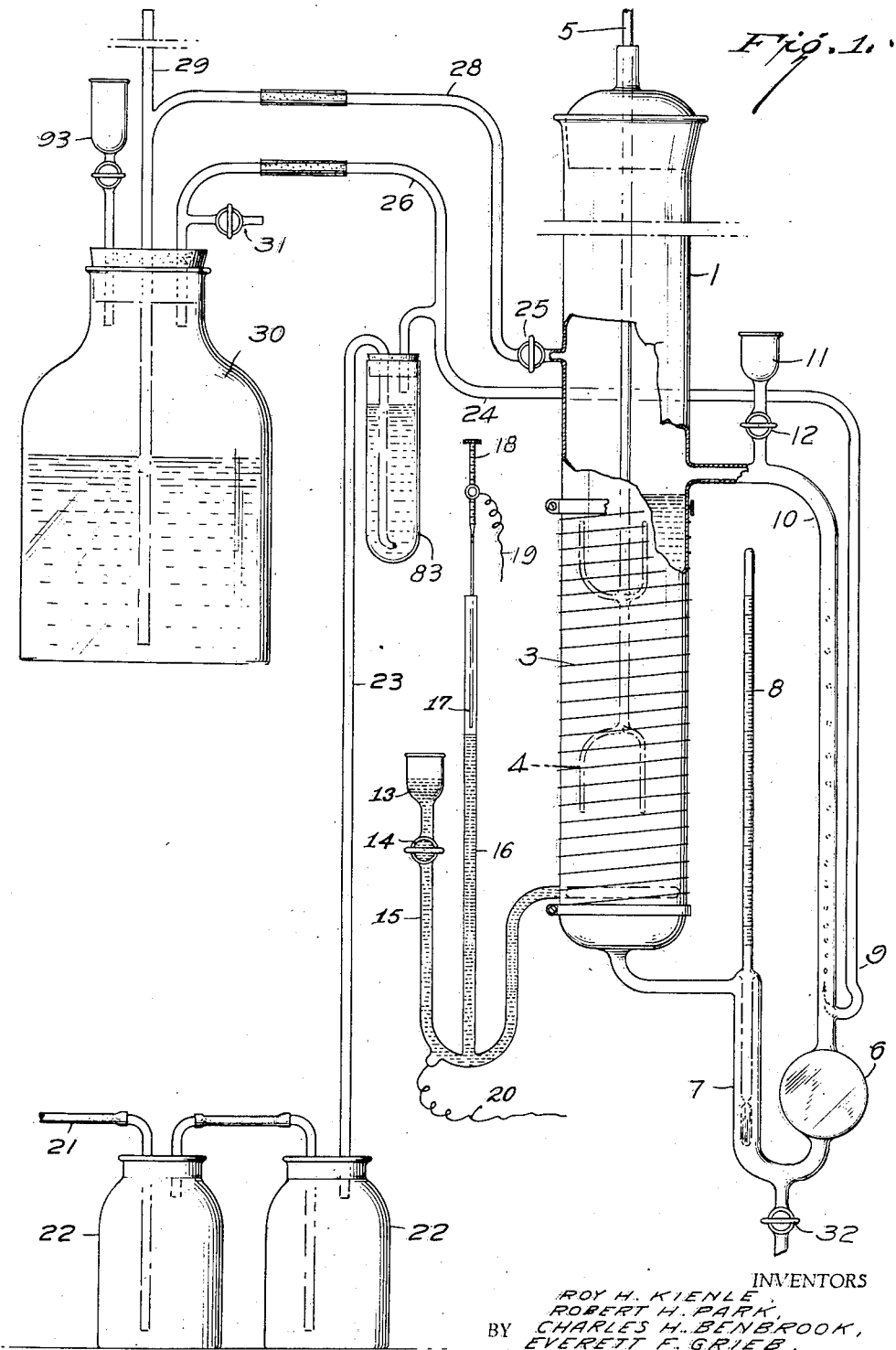
Fig. 1 is an elevation partly broken away of a circulating system according to the present invention.

The circulating device shown in Fig. 1 consists of a reaction chamber 1 containing a reaction mixture, heating coil 3, skein holder 4 given up and down oscillatory movements by a shaft 5 driven from any suitable source of power (not shown). The liquid from the reaction chamber flows downwardly through the left hand leg of a U tube 7 provided with a thermometer 8 into an offset, thin transmission cell 6 in the right hand leg of the U tube. An air lift consisting of gas passing through the pipe 9 having a restricted opening circulates liquid from the right hand leg of the U tube up to the pipe 10, and back into the reaction chamber. The rate of circulation is determined by the amount of gas introduced in the air lift and can be adjusted to suit particular conditions.

The apparatus may be filled through a suitable filler 11 connected to the tube 10 through the stop cock 12 and the apparatus can be drained through stop cock 32 at the bottom of the U tube. The temperature can be maintained constant by means of a mercury U tube 15 in which a column of mercury 16 is connected at the bottom to wire 20 and at the top approaches an electrode 17 which is adjustable by the narrow threaded shaft 18 and leads to a wire 19 which, with wire 20, connects through a suitable relay and source of power (not shown). The relay can control in convenient manner the electrical current reaching coil 3 and thus maintains the temperature constant at any predetermined figure. In order to heat the apparatus to any desired operating temperature the stop cock 14 is opened whereupon the mercury in the fine tube 16 drops to essentially the same level as that in cup 13, and during the subsequent heating, rises only slightly because the major part of the mercury which is expelled from tube 15 by the expansion of the mercury therein, enters cup 13 because of its greater cross sectional area as compared with that of tube 16. When the desired operating temperature has been almost reached, the stop cock 14 is closed whereupon all subsequent expansion of the mercury forces mercury into the fine tube 16 until the mercury column therein touches the electrode 17 whereupon the current to coil 3 is turned off by the relay system and cooling of the system occurs until the connection with electrode 17 is broken by contraction of the column of mercury 16. The relay then reconnects the current to coil 3. Thus, the temperature fluctuates over only a very narrow range. The final setting at the desired temperature is accomplished by raising or lowering the metal shaft 18 to which is attached the electrode 17.

The figure shows an automatic means for filling the device without subjecting the liquid to contact with the air. This is effected by using the gas which is employed for circulation in the air lift to pump in liquid to fill the reaction chamber. The gas is shown as coming from a suitable pressure tank or pump through the pipe 21 and a couple of wash bottles 22 up through the pipe 23 into a gas preheating and moistening chamber 83 and thence to the air lift through pipe 24. Pipe 26 leads to the reservoir 30. Liquid from the reservoir rises in the tube 29 and the height of the liquid column serves to measure the pressure under which the gas is flowing into the air lift. The reservoir may be filled through 93. Liquid may be transferred from the reservoir to the reaction vessel by opening stop cock 25 and pressure within the system may be released by opening stop cock 31. Change in dilution of the reaction solution is prevented by pumping the gas used in the lift through a body of the same liquid used in the reaction chamber (usually water) in the vessel 83 which is maintained at approximately the same temperature as that of the reaction bath. As a result the gas used in the air lift is saturated with moisture at the elevated temperature and no loss from the reaction chamber will take place.

Figure 2:
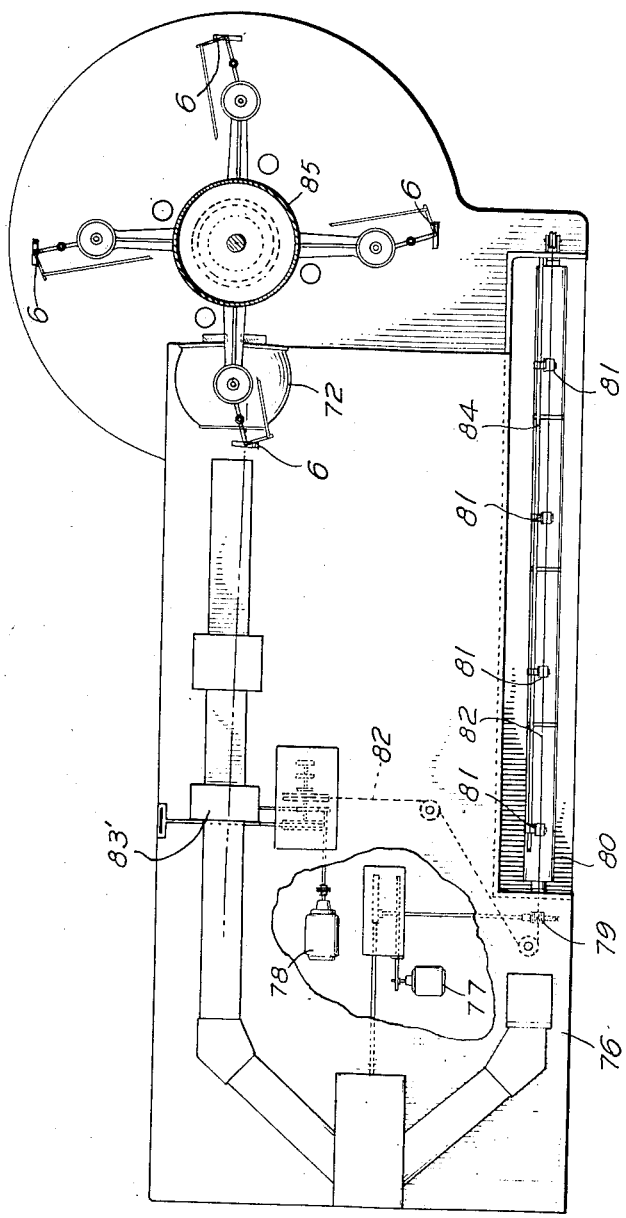
Fig. 2 is a diagrammatic representation in plan of a flickering beam type of spectrophotometer and a plurality of circulating devices according to the present invention arranged for successive measurement on the spectrophotometer.

Figs. 2 and 3 show an embodiment of the invention in which a plurality of reaction chambers with off-set cells, such as that illustrated in greater detail in Fig. 1, are positioned successively in the path of one of the beams of a flickering beam type spectrophotometer. The spectrophotometer is shown diagrammatically and is designated by the reference number 76. The spectrophotometer is of the type described in the patent to Orrin W. Pineo No. 2,107,836, and is actuated by a motor 77 driving the monochromator so as to cause it to admit a narrow band of light beginning at one end of the spectrum and passing through it to the other, or through any shorter range, in the spectrum. This motor also drives through suitable gearing 79 a long drum 80 on which are positioned as many paper recording surfaces as there are cells to be measured. The motor 78 is the balance motor of the spectrophotometer which drives through a suitable set of cams the photometering prism in the housing 83'. This motor also drives through the cable 82, a series of pens 81 which slide on a shaft 84 and which can be tripped out of engagement with the recording paper surface manually. The pens are of the ordinary type for such recording. It will be noted that the spectrophotometer is of commercial flickering beam type except that the recording drum is much larger and has space for making a plurality of records successively.

The four reaction chambers of the type shown in Fig. 1 with their cells 6 are mounted on a rotatable cylinder 85 which can be moved into any one of four positions locating the cell 6 of one of the four reaction chambers in one of the beams going to the integrating sphere 72 of the spectrophotometer.

In operation four reactions are started and spectrophotometric curves are taken of the four successively by positioning first one and then the other before the integrating sphere of the spectrophotometer and engaging the corresponding pen 81, the spectrophotometer being started for each record. Where the change in color in the reaction chambers is comparatively slow, a full record throughout the spectrum may be taken each time. Where, however, the change is rapid, a portion of the spectrum is chosen where there is a sharp peak or valley in the spectrophotometric curve, and curves are taken only through this chosen region. In other records the spectrophotometer is not operated from one end of the spectrum to another but only over a limited region. In many cases a reaction starts rapidly and then slows down. In such cases records through a narrow region of the spectrum may be taken at first and then as the reactions have slowed down, complete curves can be drawn. In general, the same recording papers remain on the drums and the successive curves are drawn on the same paper to show the change with time.

The embodiment of the invention shown in Figs. 2 and 3 may be used with any number of reaction chambers but in practice it has been found that four is about as many as can be effectively handled by one spectrophotometer. When a larger number is used, the time interval between measurements will often be too great for accuracy. Of course, a smaller number may be used such as two or three in the case of reactions which change rather fast and in which successive records are required at more frequent intervals.

We claim:

A device for intermittently measuring changes in optical radiation at different wave lengths in a plurality of reaction mixtures comprising in combination a flickering beam type spectrophotometer having an inlet window for the optical radiation to be measured, a plurality of reaction chambers mounted on a framework, means for circulating a portion of liquid from each of said reaction chambers to respective transparent cells and back to the reaction chamber, each cell being also mounted on said framework, means for rotating said framework, the framework being positioned with respect to the spectrophotometer inlet window so that the transparent cells are successively brought into optical alignment with said inlet window.

ROY HERMAN KIENLE.
ROBERT H. PARK.
CHARLES H. BENBROOK.
EVERETT F. GRIEB.